United States Patent [19]

Geertsema et al.

[11] 4,406,559

[45] Sep. 27, 1983

[54] REMOVABLE TOOL HANDLE AND SOCKET THEREFOR

[75] Inventors: John A. Geertsema, P.O. Box 1014, Ceres, Calif. 95307; Alvin H. Lichty, Modesto, Calif.

[73] Assignee: John A. Geertsema, Ceres, Calif.

[21] Appl. No.: 300,816

[22] Filed: Sep. 10, 1981

[51] Int. Cl.³ .......................... B25G 3/00; F16B 1/00; F16D 1/06

[52] U.S. Cl. .................................... 403/287; 403/286; 15/145; 16/115

[58] Field of Search ............... 403/383, 334, 287, 286, 403/330, 327, 328, 322, 324, 325, 305, 306, 301, 108, 329, 361; 285/7, 193 B; 16/115; 15/176, 145

[56] References Cited

U.S. PATENT DOCUMENTS

| | | | |
|---|---|---|---|
| 724,708 | 4/1903 | Jones | 403/329 X |
| 1,331,806 | 2/1920 | Curtis | 403/334 X |
| 2,487,696 | 12/1947 | Coffing | 403/334 X |
| 3,008,166 | 11/1961 | Lay | 15/145 X |
| 4,079,965 | 3/1978 | Moughty | 403/108 X |
| 4,162,132 | 7/1979 | Kress | 403/361 |

*Primary Examiner*—Andrew V. Kundrat
*Assistant Examiner*—Joseph A. Fischetti
*Attorney, Agent, or Firm*—Harvey B. Jacobson

[57] ABSTRACT

An adapter sleeve to be carried by the tool head end of a handle is provided including a first end for receiving the head end of a handle therein and a second end for receiving the free end of a tool head supported shank. The second end of the sleeve includes a generally radial bore for registry with a radial bore formed in the free end of the tool head shank and an elongated spring arm having base and free ends is provided and extends longitudinally of the sleeve with the free end thereof closely adjacent the radial bore formed in the sleeve and the base end of the arm attached to the sleeve at a point spaced toward the first sleeve end from the radial bore of the sleeve. The spring arm has a slide mounted thereon and the sleeve includes a cam surface relative to which the slide is shifted during movement of the slide along the arm. The slide and cam surface coact to outwardly deflect the free end of the spring arm away from the sleeve as a result of movement of the slide along the arm in one direction and the spring arm free end includes a laterally inwardly projecting pin portion which is received through the sleeve radial bore and in the radial bore formed in the free end of the shank. When the slide is shifted relative to the arm, along the cam surface to effect outward displacement of the free end of the arm, the pin portion is outwardly retracted relative to the radial bore in the tool head shank thereby enabling withdrawal of the shank from the sleeve.

8 Claims, 7 Drawing Figures

REMOVABLE TOOL HANDLE AND SOCKET THEREFOR

BACKGROUND OF THE INVENTION

Various types of tools provided with removable handles heretofore have been provided whereby a plurality of tool heads may be selectively engaged with a single handle. However, most of these removable tool heads and handles include releasable attaching structure constructed in a manner which is difficult to operate, expensive to produce and/or subject to premature failure. Accordingly, a need exists for an improved form of connector for use in removably connecting a tool head to a handle.

Examples of various types of previously known removable tool handle structures are disclosed in U.S. Pat. Nos. 534,321, 576,756, 1,085,119, 2,564,812, 2,672,777, 2,868,051, and 3,004,362.

BRIEF DESCRIPTION OF THE INVENTION

The removable tool handle and socket of the instant invention includes a sleeve having a first end for support from the head end of a handle and a second or other end defining an outwardly opening socket into which the free end of the shank of a tool head may be removably and snugly telescoped. The end of the sleeve into which the total head shank is telescoped includes a first radial bore formed therethrough and the portion of the tool head shank telescoped within the sleeve includes a second radial bore registerable with the first radial bore. An elongated spring arm has one end anchored relative to the outer surface of the sleeve with the arm extending longitudinally of the sleeve and the other end of the sleeve includes a laterally directed pin portion which projects through the first radial bore and into the second radial bore thereby locking the tool head shank in the sleeve. A slide is mounted on the spring arm for reciprocal movement therealong and the sleeve includes ramp type cam surfaces extending along opposite sides of the spring arm with which opposite side portions of the slide are engageable. When the slide is shifted along the arm toward the pin portion it engages and slides upwardly along the cam or ramp surfaces to outwardly deflect the end of the arm from which the pin portion is supported, thereby axially retracting the pin portion from the second radial bore and enabling separation of the tool head shank from the sleeve.

The main object of this invention is to provide an inexpensive, easy to operate and dependable releasable connection between a tool head shank and a tool handle.

Another object of this invention is to provide a connection in accordance with the preceding objects and which may be readily manufactured by conventional methods at high production rates.

Still another object of this invention is to provide a connection which may, but not necessarily, be constructed of readily moldable plastic.

A further object of this invention is to provide a conection in accordance with the preceding objects and which includes structural features thereof eliminating the possibility of malfunction due to corrosion.

A final object of this invention to be specifically enumerated herein is to provide a connection in accordance with the preceding objects and which will conform to conventional forms of manufacure, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
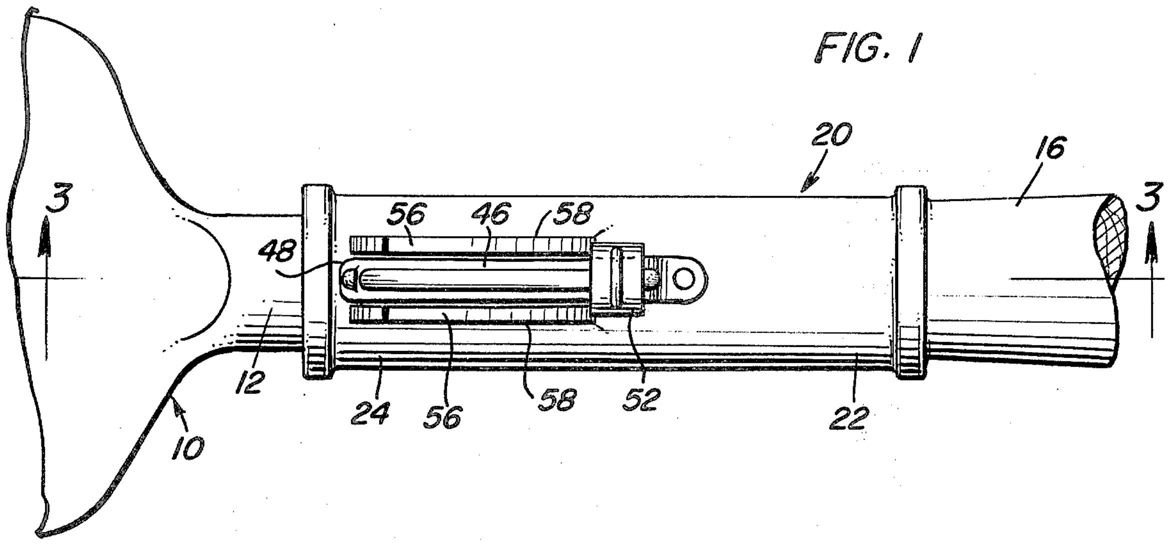
FIG. 1 is a top plan view of the releasable tool head shank and handle connection of the instant invention.
Figure 2:
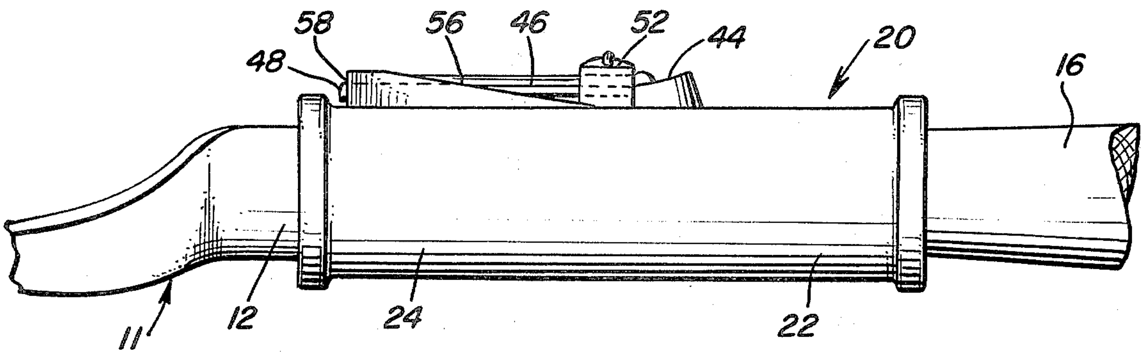
FIG. 2 is a side elevational view of the connection.
Figure 3:
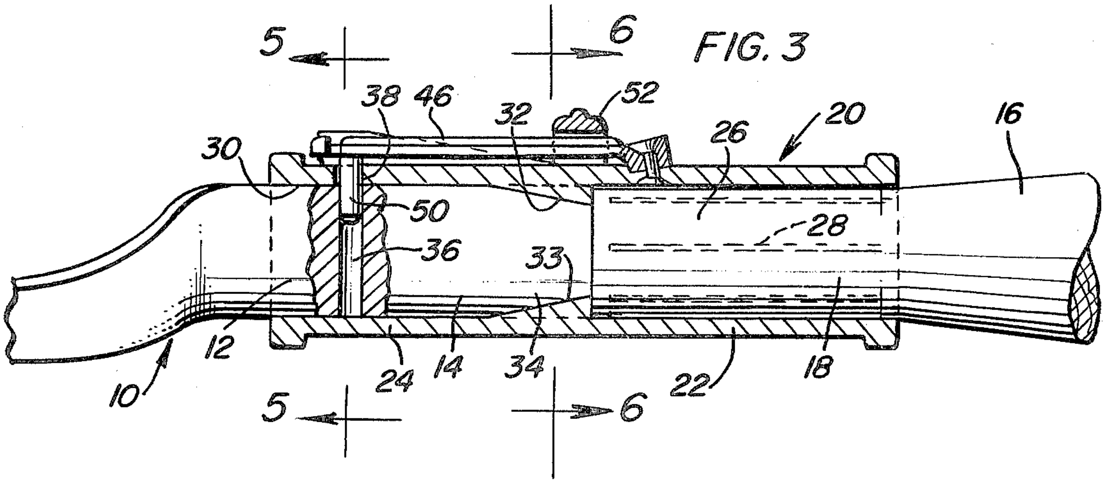
FIG. 3 is a fragmentary longitudinal vertical sectional view taken substantially upon the plane indicated by the section line 3—3 of FIG. 1.
Figure 4:
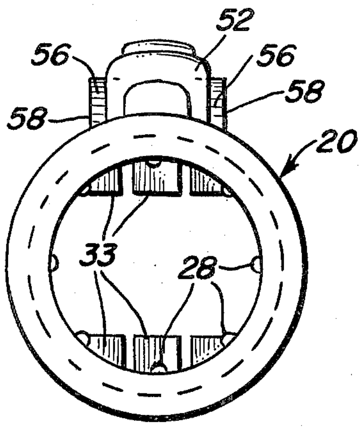
FIG. 4 is an end elevational view of the sleeve and latch structure of the connection as seen from the handle end thereof and with the handle removed.
Figure 5:
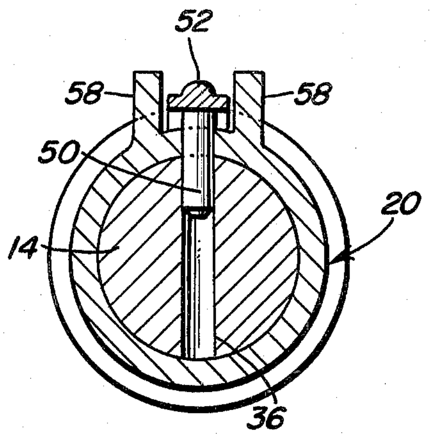
FIG. 5 is an enlarged transverse sectional view taken substantially upon the plane indicated by the section line 5—5 of FIG. 3.
Figure 6:
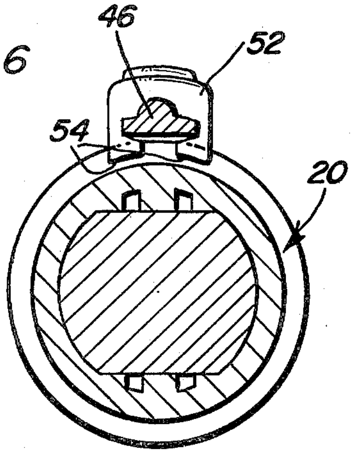
FIG. 6 is an enlarged transverse sectional view taken substantially upon the plane indicated by the section line 6—6 of FIG. 3.
Figure 7:
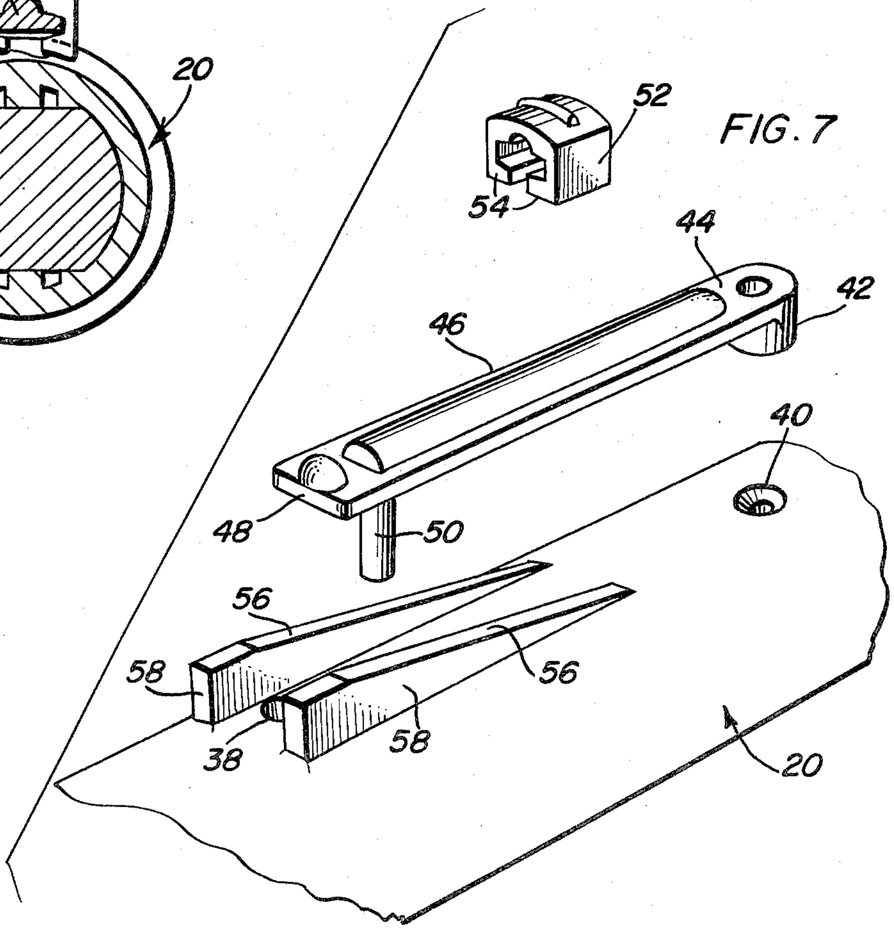
FIG. 7 is a fragmentary exploded perspective view of the sleeve portion of the invention together with the locking pin supporting spring arm and slide structure supported therefrom.

Referring now more specifically to the drawings the numeral 10 generally designates a tool head including a shank portion 12 projecting outwardly therefrom and including a free end 14. The numeral 16 indicates a tool handle including a substantially cylindrical tool head supporting end 18 and the reference numeral 20 generally designates a connector sleeve. The sleeve 20 includes first and second ends 22 and 24 and the first end 22 defines a generally cylindrical bore 26 extending longitudinally thereof and including circumferentially spaced, longitudinally extending and radially inwardly projecting ribs 28. The handle 16 may be constructed of wood and the head supporting end 18 of the handle 16 is snugly telescopingly receivable within the bore 26 with the ribs 28 frictionally gripping and indenting the outer surface of the head supporting end 18 of the handle 16. In this manner, the handle 16 is securely supported from the connector sleeve. Of course, other structure could be utilized in removably supporting the connector sleeve 20 from the head supporting end 18 of the handle 16.

The end of the connector sleeve 20 remote from the handle supporting end 18 defines a substantially cylindrical bore 30 therein and the inner end of the bore 30 is inwardly tapered as at 32, the taper 32 being defined by diametrically opposite and transversely spaced inwardly projecting wedges 33. The free end 14 of the shank portion 12 is cylindrical and includes a tapered terminal end 34 which may be seated in the tapered inner end 32 of the bore 30.

The free end 14 includes a diametric bore 36 and the connector sleeve 20 includes a radial bore 38 formed therein with which the diametric bore 36 may be registered. The outer surface of the connector sleeve 20 includes a depression 40 in which a mounting lug portion 42 of the base end 44 of an elongated spring arm 46 is secured. The end of the spring arm 46 remote from the base end 44 defines a free end 48 and the free end 48 includes a laterally projecting pin portion 50 formed integrally therwith, the pin portion 50 projecting inwardly through the radial bore 38 and into one end of the diametric bore 36 and the diametric bore 36 comprising a pair of interconnected aligned opposite radial bores.

The spring arm 46 has a slide 52 mounted thereon for guided reciprocal shifting longitudinally thereof and the slide 52 includes opposite side portions 54 which are slidably engageable with wedge or ramp surfaces 56 defined on a pair of elongated ramps 58 formed integrally with the connector sleeve 20 and extending therealong on opposite sides of a path extending between the radial bore 38 and the depression 40. The opposite side portions 54 are movable upwardly along the ramp surfaces 56 when the slide 52 is shifted longitudinally of the support arm 46 from the base end 44 thereof toward the free end 48 thereof and in this manner the pin portion 50 is axially retracted outwardly of the diametric bore 36 to enable axial retraction of the free end 14 of the shank portion 12 from the bore 30. Of course, it is to be noted that tool heads other than the tool head 10 may be provided and equipped with shank portions having free and terminal ends corresponding to the free and terminal ends 14 and 34 and that such other tool heads may be alternately supported from the connector sleeve 20. In addition, inasmuch as the handle 16 is removably supported from the connector sleeve 20, the handle 16 may be replaced by a different handle including a head support and similar to the head support end 18.

The connector sleeve 20, the support arm 46 and the slide 52 may all be constructed of plastic, if desired. Of course, other materials may be used as long as they have the required strength and flexive properties required by the spring arm 46.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An adapter sleeve to be carried by the tool head end of a tool handle and including a first end for support from the head end of a handle, the other end of said sleeve defining an outwardly opening socket, a tool head including a shank projecting outwardly therefrom and having a free end, said free end being removably and snugly telescoped into said socket, said other sleeve end including a generally radial bore therein opening into said socket, said free end having a generally radial bore therein registered and aligned with the first mentioned bore, an elongated spring arm having base and free ends, said base end being anchored relative to the outer surface of said sleeve at a point thereon spaced longitudinally of said sleeve from the first mentioned bore toward said first sleeve end with said spring arm extending longitudinally of said sleeve, said free spring arm end including a lateral pin portion projecting inwardly through the first mentioned bore and into the second mentioned bore, said spring arm and the portions of said sleeve along which said arm extends including coacting cam surface means and reciprocal slide means supported therefrom operable to selectively displace said free spring arm end outwardly from said sleeve responsive to shifting of said slide means in one direction for withdrawing said pin portion outwardly of at least the second mentioned bore, said cam surface means being supported from said sleeve and said slide being slidably mounted on said arm for guided reciprocal shifting therealong.

2. The adapter sleeve of claim 1 wherein said cam surface means comprises a pair of elongated cam ramps carried by said sleeve on opposite sides of said spring arm and extending longitudinally along the latter, said slide including opposite side portions disposed on opposite sides of said spring arm slidingly engaged with said ramps.

3. The adapter sleeve of claim 1 wherein said second mentioned radial bore comprises one end portion of a generally diametric bore formed in said free end.

4. The adapter sleeve of claim 1 wherein said outwardly opening socket includes an inwardly tapering inner end portion and the terminal end portion of said free end is similarly tapered for seated engagement against said inner end portion.

5. The adapter sleeve of claim 1 wherein said sleeve, arm, pin portion and slide are constructed of plastic.

6. The adapter sleeve of claim 1 wherein said socket and free end are circular in cross-section.

7. The adapter sleeve of claim 1 wherein said fist end includes longitudinal, radially inwardly projecting ribs on the interior surface thereof.

8. An adapter sleeve to be carried by the tool head end of a tool handle and including a first end for support from the head end of a handle, the other end of said sleeve defining an outwardly opening socket, a tool head including a shank projecting outwardly therefrom and having a free end, said free end being removably and snugly telescoped into said socket, said other sleeve end including a generally radial bore therein opening into said socket, said free end having a generally radial bore therein registered and aligned with the first mentioned bore, an elongated spring arm having base and free ends, said base end being anchored relative to the outer surface of said sleeve at a point thereon spaced longitudinally of said sleeve from the first mentioned bore toward said first sleeve and with said spring arm extending longitudinally of said sleeve, said free spring arm end including a lateral pin portion projecting inwardly through the first mentioned bore end into the second mentioned bore, said spring arm and the portions of said sleeve along which said arm extends including coacting cam surface means and reciprocal slide means supported therefrom operable to selectively displace said free spring arm end outwardly from said sleeve responsive to shifting of said slide means in one direction for withdrawing said pin portion outwardly of at least the second mentioned bore, said cam surface means being supported from said sleeve and said slide being slidably mounted on said arm for guided reciprocal shifting therealong, said cam surface means comprising a pair of elongated cam ramps carried by said sleeve on opposite sides of said spring arm and extending longitudinally along the latter, said slide including opposite side portions disposed on opposite sides of said spring arm slidingly engaged with said ramps, said outwardly opening socket including an inwardly tapering inner end portion and the terminal end portion of said free end being similarly tapered for seated engagement against said inner en portion, said first end including longitudinal, radially inwardly projecting ribs on the interior surface thereof.

* * * * *